United States Patent

[11] 3,573,383

[72] Inventors Andre Ernest Antoon Lauwers Muizen; Armand Marie Cecile Alexandre Vandevelde, Linden; Gerard Richard Josef Lezy, Izegem, Belgium

[21] Appl. No. 758,216
[22] Filed Sept. 9, 1968
[45] Patented Apr. 6, 1971
[73] Assignee International Standard Electric Corporation New York, N.Y.
[32] Priority Sept. 22, 1967
[33] Netherlands
[31] 6,712,959

[54] SCANNING ARRANGEMENT IN A TELEPHONE SWITCHING SYSTEM
6 Claims, 4 Drawing Figs.

[52] U.S. Cl. .......... 179/18, 179/18(GF)
[51] Int. Cl. .......... H04q 3/48
[50] Field of Search .......... 179/18 (BT), 18.7 (YA)

[56] References Cited
UNITED STATES PATENTS

| | | | |
|---|---|---|---|
| 3,430,000 | 2/1969 | Rohrig | 179/18(BT) |
| 3,414,678 | 12/1968 | Hackenberg | 179/18(BT) |
| 3,249,699 | 5/1966 | Mol et al. | 179/18(BT) |
| 2,967,212 | 1/1961 | Burston et al. | 179/18(BT) |

*Primary Examiner*—Kathleen H. Claffy
*Assistant Examiner*—Thomas W. Brown
*Attorneys*—C. Cornell Remsen, Jr., Rayson P. Morris, Percy P. Lantzy, W. J. Baum, J. Warren Whitesel and Delbert P. Warner

ABSTRACT: In a switching system, a scanning arrangement is provided to interrogate a plurality of links interconnecting a plurality of switching stages of the system for determining their busy and idle conditions. The scanning arrangement includes a plurality of diode-gating means responsive to the interrogating signals for applying the busy and idle status signals of the links to the register means of the system wherein each of said diode-gating means is coupled to the scanning means and the register means and to a corresponding one of the plurality of links. Each of the diode gating means includes a DC potential source, a junction, first resistor coupling the DC potential source to the junction, second resistor coupling the junction to the corresponding link, a capacitor coupling the scanning means to the junction, and a diode being coupled to the junction and being poled to change from a nonconductive to conductive state in response to the change in the condition of the corresponding link from an idle to busy condition. The system is also provided with a plurality of biasing means, each means establishing a predetermined common bias potential level at the output of a selected number of the plurality of the diode-gating means.

SCANNING ARRANGEMENT IN A TELEPHONE SWITCHING SYSTEM

BACKGROUND OF THE INVENTION

1. Field of the Invention

The present invention relates to a scanning arrangement in a telephone-switching system for determining the free or busy conditions of the links interconnecting the switching stages of the system, in general, and more particularly, to an improved scanning arrangement having gating means coupled to the links for testing their free or busy conditions.

2. Description of the Prior Art

In accordance with the prior art such as British Pat. No. 981,908, a plurality of links interconnecting a plurality of switching stages are scanned by a scanning arrangement having a plurality of gating circuits respectively coupled to the links. According to the patent, the gating circuits include magnetic cores which are arranged with discrete electrical components. Such as arrangement has been found rather complex and expensive.

SUMMARY OF THE INVENTION

It is an object of the present invention to provide an improved scanning arrangement which overcomes the aforementioned shortcomings of the prior art.

In accordance with the invention, there is provided a scanning arrangement in which each of the gating circuits includes first and second resistances, a capacitance and a diode, each with a common terminal, the other terminals of said first and second resistances being connected to the associated link and to a first DC potential respectively, the other terminal of said diode, which constitutes the output terminal of said gate, being coupled to a second DC potential while the other terminal of said capacitance is connected to said pulse source, and that the state of conductivity of said diode is reversed when an interrogation pulse is applied to said gate and simultaneously the associated link is in a predetermined one of its two states.

According to another characteristic of the present testing arrangement, the ratio of said first and second resistances of each gate is chosen to approximatively obtain the same predetermined potential at their common terminal when the associated link is busy and irrespective of the link type when each type is characterized by a different value of busy potential.

The present invention also relates to a matrix arrangement in which a column circuit is coupled to a plurality of row conductors via respective unidirectional impedances.

Such a matrix arrangement is well known in the art but presents a relatively high leakage capacitance. Therefore it is a further object of the present invention to provide a matrix arrangement of the above type which does not present the mentioned drawback.

The present matrix arrangement is characterized by the fact that said column circuit includes $m$ column conductors each associated with a corresponding group of said row conductors and that said $m$ column conductors are connected in common to the input of an output amplifier via $m$ respective second unidirectional impedances.

The above mentioned and other objects and features of the invention will become more apparent and the invention itself will be best understood by referring to the following description of embodiments taken in conjunction with the accompanying drawings in which:

DETAILED DESCRIPTION OF THE INVENTION

Figure 1:
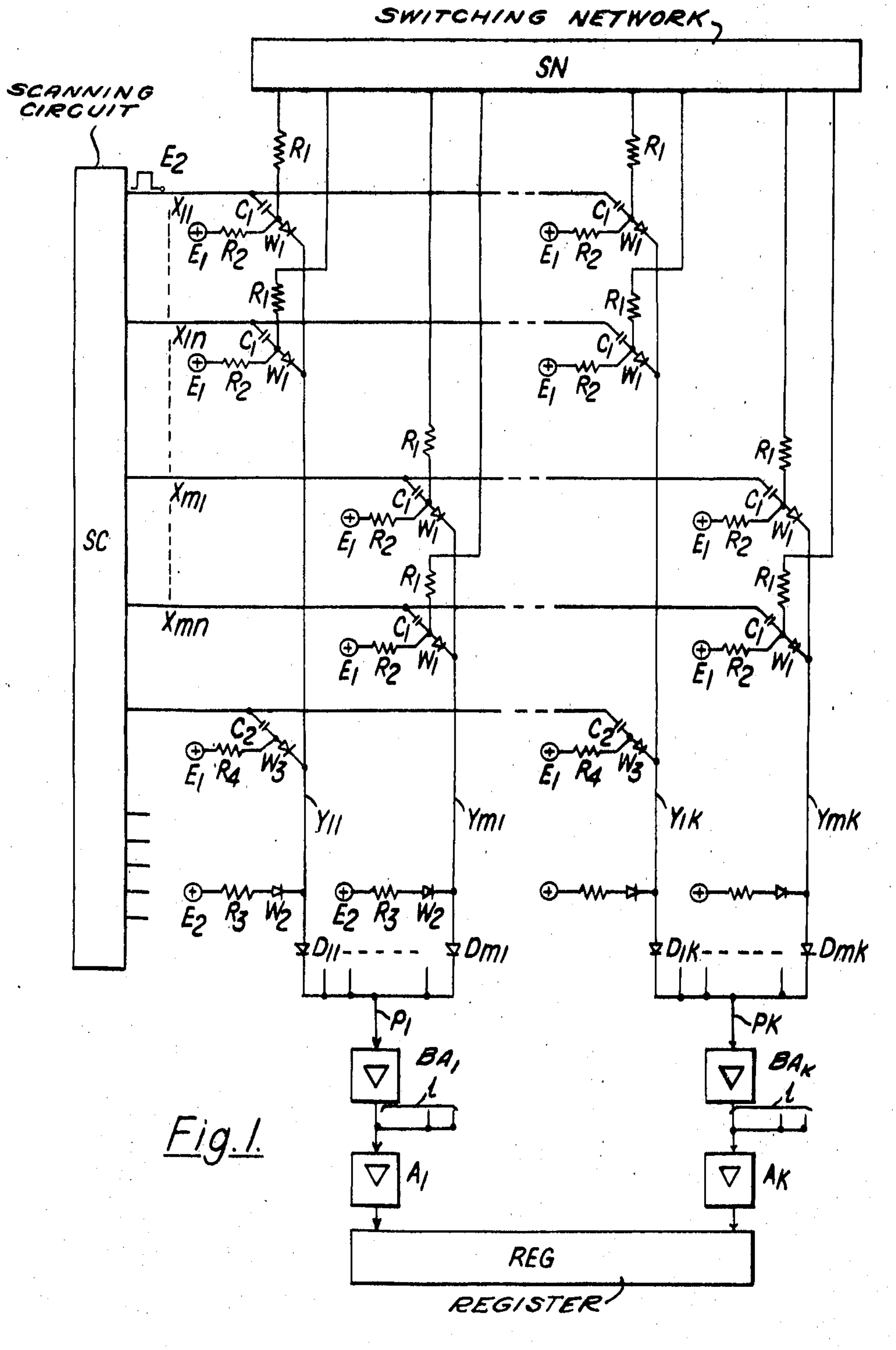
FIG. 1 shows a testing arrangement in accordance with the invention, for testing the free and busy states of the links of a telephone exchange switching network.

Referring to FIG. 1, the testing arrangement shown therein comprises a matrix. The matrix is made of an array of crossover points formed by $n$ planes each having $m$ rows, where each of the $m$ rows are crossed by $k$ columns and where $m$, $n$, and $k$ are integer numbers. The matrix is thus a three-dimensional one formed by crossover points made by $k$, by $m$, by $n$ intersecting crossover points. The $m$ by $n$ row wires of the matrix are divided in $m$ groups of $n$ row wires $X_{11}$ ... $X_{1n}$ to $X_{m1}$ ... $X_{mn}$ and the row wires of each of these $m$ groups are coupled to the $k$ matrix outputs $P_1$ to $P_k$ via $k$ corresponding column wires $Y_{11}$ ... $Y_{1k}$ to $Y_{1m}$ ... $Y_{mk}$ and associated decoupling diodes $D_{11}$ ... $D_{1k}$ to $D_{m1}$ ... $D_{mk}$. The free ends of the row wires $X_{11}$ to $X_{mn}$ of the above matrix are connected to respective ones of the $lmn$ outputs of a scanning circuit SC. Each of the $k$ outputs $P_1$ to $P_k$ of a matrix is connected to a corresponding input of a register circuit REG via the cascaded connection of a buffer amplifier $BA_1$ to $BA_k$ and a column amplifier $A_1$ to $A_k$ respectively, the column amplifiers $A_1$ to $A_k$ and register REG being common to the matrix of the testing arrangement. The crosspoints of the row wires $X_{11}$ to $X_{mn}$ and column wires $Y_{11}$ to $Y_{mk}$ are each constituted by a gating circuit comprising four elements which have a common terminal: a capacitor $C_1$, a diode $W_1$ and two resistors $R_1$ and $R_2$. The free end of capacitor $C_1$ and the cathode of diode $W_1$ are connected to their associated row and column wires respectively, whereas the free ends of resistors $R_1$ and $R_2$ are connected to an associated link (not shown) of a switching network SN and to a source of positive DC potential $E_1$ respectively.

Each of the column wires $Y_{11}$ to $Y_{mk}$ of a matrix is further connected to a source $E_2$ of positive DC potential via a respective series connection of a diode $W_2$ and a resistor $R_3$ ($R_3$=1 ,300 ohms). The matrix of the testing arrangement moreover includes an additional row $X_1$ which serves for checking purposes as it will be described later. This row $X_1$ is connected to one column wire, e.g. $Y_{11}$ to $Y_{1k}$, out of each of the $k$ sets of $m$ column wires leading to a corresponding matrix output $P_1$ and $P_k$, via a respective crosspoint gating circuit comprising three elements with a common terminal. The crosspoint gates associated with row $X_1$ each comprise a capacitor $C_2$ ($C_2$=$C_1$), a diode $W_3$ and a resistor $R_4$ ($R_4$=150 kilohms), the free terminals of capacitors $C_2$ and the cathodes of diodes $W_3$ being connected to row wire $X_1$ and to column wires $Y_{11}$ to $Y_{1k}$, respectively. The free ends of resistors $R_4$ are connected to the source $E_1$ of positive DC potential.

Figure 2:
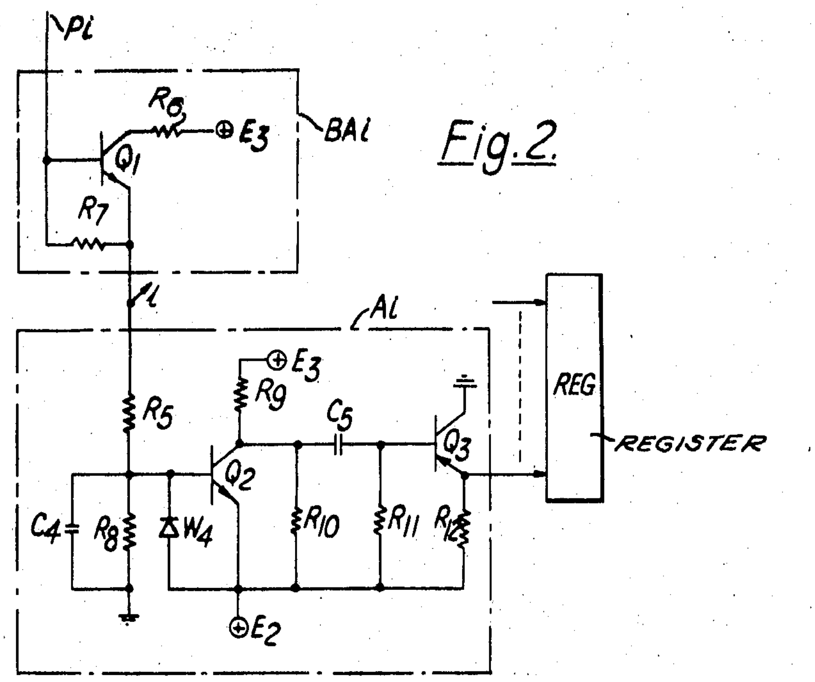
FIG. 2 shows in detail part of a column circuit of the arrangement of FIG. 1.

FIG. 2 shows the detailed circuitry of the buffer and column amplifiers $BA_i$ and $A_i$ respectively ($i$=1 to $k$). The buffer amplifier $BA_i$ comprises an NPN transistor $Q_1$ mounted in the emitter follower configuration. The base of transistor $Q_1$ is connected, on the one hand to its emitter via a resistor $R_7$, and on the other hand directly to the output $P_i$ of the matrix associated with the amplifier $BA_i$. The collector of transistor $Q_1$ is connected to a source $E_3$ of positive DC potential via a resistor $R_6$. The parallel connection of the outputs of the 1 homologue buffer amplifiers $BA_i$ ($i$=1 to $k$), which are respectively associated to the matrix of the testing arrangement, is connected to ground via a resistor $R_5$ in series with the parallel connection of a resistor $R_8$ and a capacitor $C_4$, resistors $R_8$ and $R_5$ and capacitor $C_4$ forming part of the common output amplifier $A_i$. The latter amplifier $A_i$ comprises two NPN transistors $Q_2$ and $Q_3$. The base of transistor $Q_2$ is connected directly to the junction of resistors $R_8$ and $R_5$ and to its emitter via a diode $W_4$, the common connection of the anode of diode $W_4$ and the emitter of transistor $Q_2$ being connected to the source $E_2$. The collector of transistor $Q_2$ is connected to the source $E_3$ of positive DC potential and to the source $E_2$ via a resistor $R_9$ and a resistor $R_{10}$ respectively and to the base of transistor $Q_3$ via a capacitor $C_5$. The transistor $Q_3$ has its emitter connected to ground and its base further connected to the source $E_2$ via a resistor $R_{11}$. The collector of transistor $Q_3$ which constitutes the output of column amplifier $A_t$ is connected on the one hand to the 1-input of a corresponding bistable device (not shown) of register REG and on the other hand to the source $E_2$ via a resistor $R_{12}$.

Figure 3:
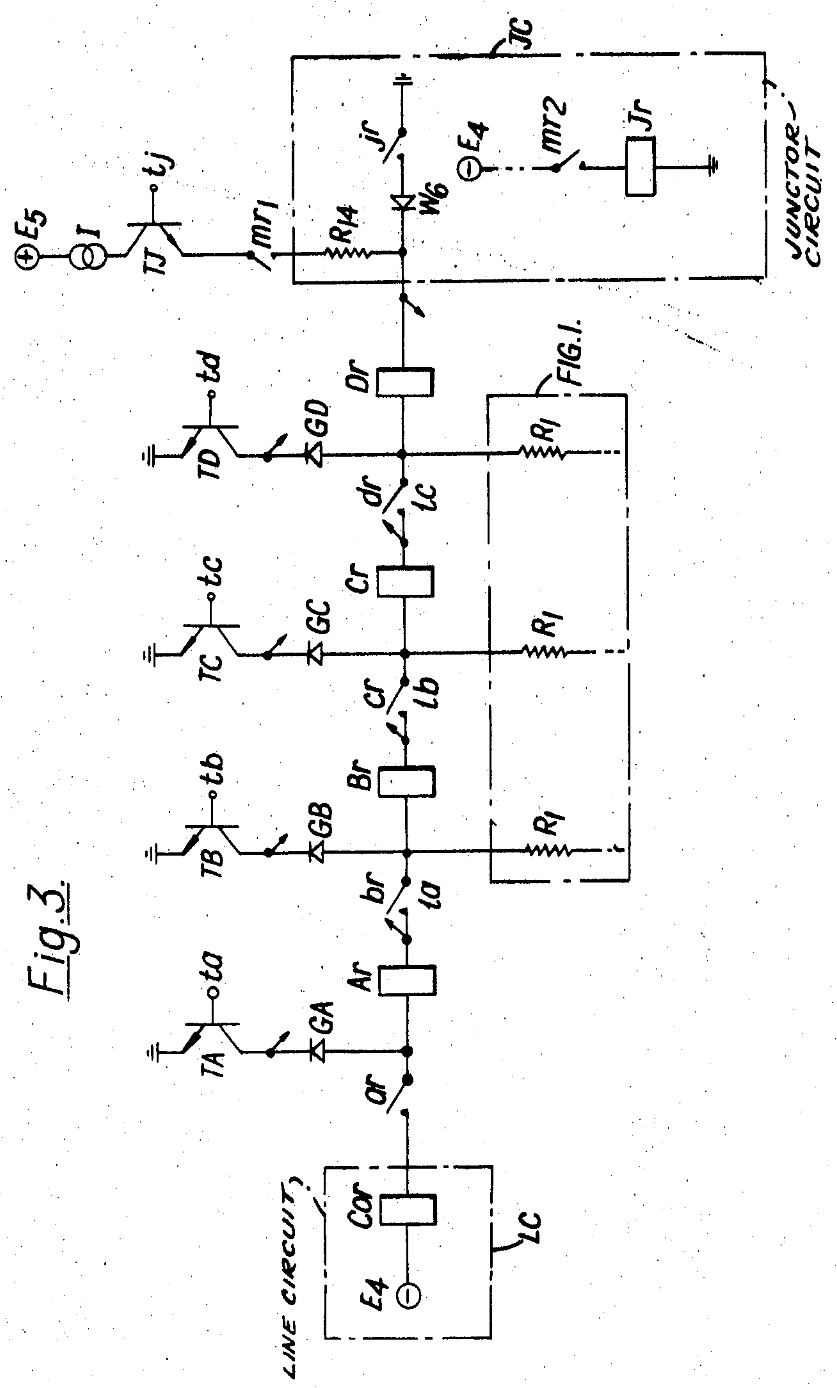
FIG. 3 schematically represents a path between a subscriber's line circuit and a junctor circuit in the switching network of FIG. 1, as well as the marking switches associated thereto.

FIG. 3 schematically shows a path between the cutoff relay *Cor* of a subscriber's line circuit LC and a junctor circuit JC in the switching network SN wherein the subscriber's line circuits and the junctors are intercoupled through four cascaded switching stages which are themselves intercoupled via links. The path between the cut off relay *Cor* and the junctor circuit LC may be established through these four cascaded switching stages and more particularly through the four relays *Ar*, *Br*, *Cr*, *Dr* and their make contacts *ar*, *br*, *cr*, *dr* included in these switching stages respectively. Hereby contact *ar* interconnects the relays *Cor* and *Ar*, contract *br* the relays *Ar* and *Br*, contact *cr* the relays *Br* and *Cr* and contact *dr* the relays *Cr* and *Dr*. The links between relays *Ar*–*Br*, *Br*–*Cr* and *Cr*–*Dr* are referred to as, *la*, *lb*, *lc* (links -*a*, -*b*, -*c*) respectively. The other ends of relays *Dr* and *Cor* are connected to ground via the series connection of a decoupling diode $W_6$ and the make contact *jr* of a relay *Jr* of the junctor circuit JC, and to a source $E_4$ of negative DC potential respectively. The junction point of the cathode of diode $W_6$ and relay *Dr* is connected to the emitter of an NPN switching transistor TJ, via the series connection of a resistor $R_{14}$ and the make contact $mr_1$ of a relay *Mr* (not shown) associated to junctor JC. The collector of transistor TJ is connected to a source $E_5$ of positive DC potential via a current source *I*. The junction point of contact *ar* and relay *Ar* (contact *br* and relay *Br*, contact *cr* and relay *Cr*, contact *dr* and relay *Dr*) is connected to the collector of an NPN switching transistor TA (TB, TC, TD) via a decoupling diode GA (GB, GC, GD). The emitters of transistors TA, TB, TC, TD are connected to ground, whereas their bases *ta*, *tb*, *tc*, *td*, as well as the base *tj* of transistor TJ are connected to respective outputs of a path marking circuit (not shown). The relay *Jr* has one of its two ends connected to ground and its other end coupled to the source $E_4$ via the make contact $mr_2$ of the above relay *Mr*. The links *la*, *lb*, *lc* of the above path are connected to three corresponding resistors $R_1$ of the testing arrangement of FIG. 1, previously described.

Figure 4:
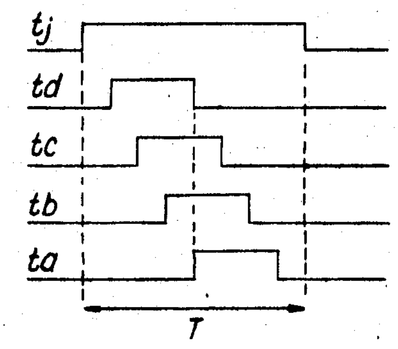
FIG. 4 shows some marking pulse waveforms involved in the establishment of the path of FIG. 3.

FIG. 4 is a diagram representing the pulse waveforms *ta*, *tb*, *tc*, *td*, *tj*, applied by the above-mentioned path-marking circuit to the corresponding base electrodes of the switching transistors TA, TB, TD, TJ, during the establishment of the connection between the line circuit JC. The function of these waveforms will hereinafter be explained together with the principle of operation of the whole arrangement.

When the above path-marking circuit receives from a central processor (not shown) of the exchange the order to establish the path of FIG. 3, it energizes the above relay *Mr* associated to the junctor JC. The energized relay *Mr* closes its make contacts $mr_1$ and $mr_2$, the closure of make contact $mr_1$ interconnecting the emitter of transistor TJ and resistor $R_{14}$ and the closure of make contact $mr_2$ causing the energization of relay *Jr*. At the same time the pulse *tj*, which has a width *T* equal to the marking period of the path, is applied to the base *tj* of the normally cutoff transistor so that this transistor TJ is switched to the conductive condition. A positive potential $E_5$ is thus applied to the junction point of diode $W_6$ and relay *Dr* so that diode $W_6$ is blocked. The latter diode decouples the termination of the path LC–JC from the ground which is connected thereto via closed contact *jr* of relay *Jr*. After the start of application of pulse *tj*, pulses *td*, *tc*, *tf*, *ta* of equal width with respect to each other are consecutively applied to the corresponding bases of transistors TD, TC, TB, TA, the trailing edge of first applicated pulse *td* coinciding with the leading edge of last applicated pulse *ta*. In this way relays *Dr*, *Cr*, *Br* and *Ar* are energized one after another via their associated diodes GD, GC, GB, GA and transistors TD, TC, TB, TA. The energization of relay *Ar* and the subsequent closure of contact *ar* causes the energization of cutoff relay *Cor* of the relevant line circuit LC. At the end of pulse *tj*, i.e. of the path marking period T, transistor T*j* is switched back to its cutoff condition. Due to transistor TJ being switched off and the connection from cathode of diode $W_6$ to source to source $E_4$ being established, the latter diode $W_6$ becomes conductive and the path LC–JC is held by the closed make contact *jr* of relay *Jr*. The above relay *Mr* which controls relay *Jr* via contact $mr_2$ is held operated until the end of the busy condition of its associated junctor circuit JC. The release of path LC–JC, established as above, is performed by releasing this relay *Mr*. Contact $mr_2$ of the released relay *Mr* breaks the holding path of relay *Jr*, thus causing the release thereof and hence the opening of its make contact *jr*. Due to the connection LC–JC being broken by the opening of contact J*r*, relays *Cor*, *Ar*, *Br*, *Cr*, *Dr* are released.

It is to be noted that the links *la*, *lb*, *lc*, when in the busy state, are at different potentials with respect to one another, owing to the voltage drops across their associated relays in cascade. Obviously, the switching network SN includes other paths interconnecting circuits of different types of the telephone exchange, e.g. signalling circuits and outgoing junction circuits etc., but it can be so designed that the links of the switching stages of all these paths have busy state potentials substantially equal to the busy state potentials of the links *la*, *lb*, *lc*. The ratio of the potentiometer resistances $R_1$ and $R_2$ of each gate of the testing arrangement of FIG. 1, is chosen in accordance with the type of the relevant link, i.e. with the busy state potential value of this link. For instance, for the *a* type links which have a busy state potential of about −13 volts, the resistances $R_1$ and $R_2$ are equal to 620 K. ohms and 240 K. ohms respectively. In this way, for all busy links and irrespective of their type, the same potential of e.g. 0 volts is obtained at the junction point of the resistances $R_1$ and $R_2$ in each of the gates correspondingly associated thereto. When a link of switching network SN is in the free state, in which both ends of the link are floating, it is obvious that the potential at the junction point of the resistances $R_1$ and $R_2$ of its associated gate is equal to that of the source $E_1$ positive potential, e.g. +5 volts, connected thereto via the above resistance $R_2$.

It is to be noted that resistances $R_1$ and $R_2$ are of high value, in order to ensure a sufficient decoupling between the gating circuits of the testing arrangement matrices and the switching network SN.

The principle of operation of the testing arrangement of FIGS. 1 and 2 is as follows:

In the rest condition of the testing arrangement, all row wires $X_{11}$ to $X_{mn}$, as well as row wire $X_1$ in the matrix thereof, are at the ground potential connected thereto via the output resistors (not shown) of the associated selection gates (not shown) included in the scanning circuit SC. The diodes $W_1$ of the gating circuits of the arrangement are in their blocked condition, since their anodes are at ground potential or at the positive potential of source $E_1$ (+5 volts) depending on their associated links being in their busy or free state respectively, and their cathodes are at the more positive potential of source $E_2$, e.g. +12 volts, applied thereto via resistors $R_3$ and decoupling diodes $W_2$ associated to each column $Y_{11}$ to $Y_{mk}$. for the same reason diodes $W_3$ associated with row $X_1$ are in their blocking condition, too. Diodes $D_{11}$ to $D_{mk}$ are blocked since their anodes are biased at the positive potential of source $E_2$ via the series connections of $R_3$ and $W_2$ and since their cathodes are also biased at the same positive potential $E_2$, via conductive diodes $W_4$, resistors $R_5$ and $R_7$. Transistors $Q_1$ and $Q_2$ are in the cutoff condition, since their base and emitter electrodes are at the same potential, whereas transistors $Q_3$ are conductive. Consequently the outputs of column amplifiers $A_1$ and $A_k$ taken at the collectors of the respective transistors $Q_3$ are substantially at ground potential.

When a path has to be established through the switching stages of network SN, such as the path of FIG. 3 previously described, the above-mentioned central processor of the exchange gives orders to the scanning circuit SC to enable the interrogation of the testing arrangement gating circuits, which are associated with the links capable of forming the different constituent parts of the involved path. For time saving purposes, the crosspoints of each row of the testing arrangement are associated with links of a same type. In this way the number of rows which must be interrogated to detect the condition of the links, capable of forming the involved path, is substantially reduced.

Assuming that row $X_{11}$ of the matrix of FIG. 1 is interrogated and that only the link associated with the crosspoint of row $X_{11}$ and column $Y_{11}$ is in the busy state, the interrogation pulse applied to row $X_{11}$ through scanning circuit SC, will cause the activation of the matrix outputs $P_2$ to $P_k$ and consequently of the corresponding inputs of register REG via the associated buffer and column amplifiers $BA_2$ to $BA_k$ and $A_2$ to $A_k$. Indeed, the above interrogation pulse, which has an amplitude equal to the DC potential level of source $E_2$, e.g. 12 volts, will cause the diodes $W_1$ of all crosspoints of row $X_{11}$, except crosspoint $X_{11}/Y_{11}$ thereof, to be brought in the conductive condition since, as aforementioned, the junction point of the resistors $R_1$, $R_2$ of a gate associated with a busy or free link is at the ground potential or at a positive potential of $E_1$ volts, e.g. +5 volts, respectively. The potential of column $Y_{11}$ does not change, so that the buffer amplifier $BA_1$ and column amplifier $A_1$ remain in their rest condition and the corresponding bistable device of register REG registers a O-bit, i.e. it remains in its O-condition. The potential of columns $Y_{12}$ to $Y_{1k}$ is raised from their bias level of $E_2$ volts to $E_2+E_1$ volts (12+5 volts), this potential rise causing the blocking of diodes $W_2$ associated with columns $Y_{12}$ to $Y_{1k}$ and the conduction of diodes $D_{12}$ to $D_{1k}$. The above positive potential of $E_2+E_1$ volts is applied via the conductive diodes $D_{12}$ to $D_{1k}$ to the bases of the transistors $Q_1$ of the corresponding buffer amplifiers $BA_2$ to $BA_k$, thus causing the latter to be switched in the conductive condition. Due to the above transistors $Q_1$ being conductive, a current path is established from source $E_3$, e.g. +48 volts, to ground via resistor $R_6$, collector-emitter junction of transistors $Q_1$, resistors $R_5$ and parallel connections of resistors $R_8$ and capacitors $C_4$, respectively. The potential at the base of transistor $Q_2$, in each of the column amplifiers $A_2$ to $A_k$, becomes more positive than the potential of source $E_2$, so that diode $W_4$ is brought in the blocking condition and transistor $Q_2$ becomes conductive. Due to the transistor $Q_2$, in each of the column amplifiers $A_2$ to $A_k$, being switched in the conductive condition, the potential of its collector is lowered, e.g. from 16 volts in the rest condition to $E_2$ volts (12 volts) in the conductive condition so that a negative going pulse is applied via capacitor $C_5$ to the base of transistor $Q_3$ due to which the latter transistor is cut off and its collector potential is raised to $E_2$ volts (12 volts). In this way the bistable devices of register REG associated to the column amplifiers $A_2$ to $A_k$ are set to their 1-condition, which means that the above considered $k$-1 links are in their free state. The information thus registered in register REG, is supplied to the above central processor, register REG is reset to zero and a new interrogation order is given to the scanning circuit SC. The interrogation process is continued in the same way as described above, until the central processor obtains the necessary information about the states of the links which are capable of forming the required path.

It is to be noted that the $l$ sets of buffer amplifiers $BA_i$ ($i$=1 to $k$) respectively associated with the matrix of the arrangement, serve for lowering the output impedances of the corresponding matrices, in order to charge quickly the parasitic capacitances of the input connections of the column amplifiers $A_i$, which are common to the above $l$ matrices.

Resistors $R_7$ provide a discharge path for the parasitic capacitances of their associated columns. These parasitic column capacitances mainly constituted by the leakage capacitances of the matrix diodes, are substantially reduced, as it will hereinafter be demonstrated, by means of an appropriate division in groups of rows $X_{11}$ to $X_{mn}$ of each matrix of the testing arrangement.

Calling $C$ the leakage capacitance of each of the diodes $W_1$ and $qC$ the leakage capacitance of each of the diodes $D_{11}$ to $D_{mk}$, $q$ being a numerical factor, and assuming that an interrogation pulse is applied to a row of the matrix of FIG. 1, e.g. row $X_{11}$, the parasitic capacitance $Cp$ of a column, such as column $Y_{11}$ may be written as follows when disregarding row $X_1$ and diodes $W_2$:

$$Cp=\left[n-1+\frac{qn(m-1)}{q+n}\right]C \qquad (1)$$

Indeed, column $Y_{11}$ is charged with the parasitic capacitance ($n-1$ $c$ of the diodes $W_1$ of the crosspoints of the $n-1$ noninterrogated rows $X_{12}$ to $X_{1n}$ of group $X_{11}$ to $X_{1n}$. This parasitic capacitance ($n-1C$ is in parallel, via conductive diode $D_{11}$, with the series connection of the parasitic capacitance $q$ ($m-1$) $C$ of the $m-1$ blocked diodes $D_{21}$ to $D_{m1}$ and the parasitic capacitance $n$ ($m-1$) $C$ of the $n$ ($m-1$) diodes $W_1$ associated with the $m-1$ columns $Y_{21}$ to $Y_{m1}$.

With $mn$ constant the parasitic column capacitance $Cp$ can be minimized in function of $n$:

$$\frac{dCp}{dn}=\frac{d}{dn}\left[n-1+\frac{qn(m-1)}{q+n}\right]C=0 \qquad (2)$$

From the above relation it is derived that $Cp$ is minimum for $$n=q\left(-1+\sqrt{1+\frac{mn}{q}}\right) \qquad (3)$$

When $mn$ is large and factor $q$ is close to the unity, relation (3) gives approximately:

$$n=m \qquad (3')$$

The column capacitance $Cp'$ of a conventional matrix arrangement equivalent to the matrix arrangement of FIG. 1, is given by the following relation;

$$C'p=(mn-1)\,C \qquad (4)$$

since each column of this conventional matrix with $mn$ rows and $k$ single column conductors, is charged with the parasitic capacitance of the $mn-1$ crosspoint diodes $W_1$ of the noninterrogated rows.

Comparing the relations (4) and (1) one obtains:

$$\frac{C'p}{Cp}=\frac{mn}{m+n} \qquad (5)$$

When integers $m$ and $n>2$, which is the case for a matrix then, $$\frac{C'p}{Cp}>1$$

The above analysis clearly shows the advantages offered by the present diode matrix arrangement with respect to a conventional one.

The aim of the bias $+E_2$ volts applied to the columns $Y_{11}$ to $Y_{mk}$ of the testing arrangement matrices, via the resistors R $(R_3<<_2)$ and diodes $W_2$ associated thereto, is to prevent an interrogation pulse from becoming effective for a noninterrogated row, when a diode $W_1$ pertaining to a crosspoint gate of the latter noninterrogated row is short circuited. Indeed, suppose that an interrogation pulse is applied to row $X_{11}$, that the link associated with crosspoint $X_{11}/Y_{11}$ is in its free state and that diode $W_1$ of crosspoint $X_{1m}/Y_{11}$ is short circuited. Then, the +5 volts pulse variation ($E_1+E_2-E_2$=+5 volts) appearing on column $Y_{11}$, due to the link associated with crosspoint $X_{11}/Y_{11}$ being in its free state, will be transmitted to the noninterrogated row $X_{1n}$ via short-circuited diode $W_1$ of crosspoint $X_{1n}/Y_{11}$. This pulse of 5 volts is however of insufficient amplitude to cause any of the other diodes $W_1$ associated with row $X_{1n}$ to be brought in the conductive condition, since a bias of $E_2$=12 volts is applied to the cathodes of the latter diodes.

Finally, concerning row $X_1$ of matrix of FIG. 1, an interrogation pulse is periodically applied thereto to check the correct operation of buffer amplifiers $BA_i$ ($i$=1 to $k$) pertaining to the above matrix, as well as the correct operation of the common column amplifiers $A_i$. As it may readily be seen, the application of the interrogation pulse of +12 volts to row $X_1$, will cause the activation of all the $k$ matrix outputs $P_1$ to $P_k$ and normally all $k$ bistables of register REG must be brought in their 1-condition. In this way, most of the possible failures in column equipments may easily be detected by simple inspection of the content of register REG, after the interrogation of row $X_1$. The failures causing the output stages $Q_3$ of column amplifiers $A_1$ to $A_k$ to be permanently in their activated condition (+12 volts) are detected by a second inspection of the content of register REG, when the whole testing arrangement is in its rest condition.

While the principles of the invention have been described above in connection with specific apparatus, it is to be clearly understood that this description is made only by way of example and not as a limitation on the scope of the invention.

We claim:

1. A telephone switching system which includes scanning means for interrogating a plurality of links interconnecting a plurality of switching stages of the system and for deriving busy and idle status signals of said plurality of links to be applied to a register means of the system, wherein the improvement comprises a plurality of diode-gating means responsive to said interrogating signals for applying said busy and idle status signals of said links to said register means, each of said diode-gating means being coupled to said scanning means and said register means, and to a corresponding one of said plurality of links, each of said diode-gating means including:

a DC potential source;

a junction;

a first resistive means coupling said DC potential source to said junction;

a second resistive element coupling said junction to said corresponding link;

a capacitive element coupling said scanning means to said junction; and a first diode means being coupled to said junction and being poled to change from a nonconductive to a conductive state in response to the change in the condition of said corresponding link from an idle to busy condition.

2. The switching system in accordance with claim 1, including a plurality of biasing means, each means establishing a predetermined common bias potential level at the outputs of a selected number of said plurality of gating means.

3. The switching system according to claim 2, wherein said plurality of links generate busy condition signals of different amplitudes, the ratio of said first and said second resistances of each of said plurality of gating means being chosen so that the potentials at the respective junctions are substantially the same irrespective of the differences in the amplitudes of the busy condition signals.

4. The system in accordance with claim 3, wherein said scanning means generates interrogation pulses each having an amplitude substantially equal to said uniform bias potential level.

5. The system in accordance with claim 4, wherein each of said biasing means includes a diode poled opposite to said diode means of said gating means and conducting in response to said gating means detecting said busy status signal of the corresponding link.

6. The system in accordance with claim 5, wherein said plurality of gating means are arranged in a crosspoint gating matrix array of rows and columns, said plurality of biasing means including means for preventing short circuiting of any one of said diode means from affecting other crosspoints.